(12) United States Patent
Srivatsa et al.

(10) Patent No.: US 11,951,567 B2
(45) Date of Patent: Apr. 9, 2024

(54) SYSTEMS, AND METHODS FOR DIAGNOSING AN ADDITIVE MANUFACTURING DEVICE

(71) Applicant: General Electric Company, Schenectady, NY (US)

(72) Inventors: Ponnada V S S Srivatsa, Bangalore (IN); Venkata Rachakonda, Bangalore (IN); Mattias Fager, Onsala (SE); Paer Christoffer Arumskog, Gothenburg (SE); Megha Navalgund, Bangalore (IN); Sharan Arumugam, Bangalore (IN); Aman Tiwari, Dewas (IN); Anders Ingvarsson, Mölnlycke (SE); Fredrik Tommy Mohlin, Västra Frölunda (SE); Simon Blomé, Gothenburg (SE)

(73) Assignee: General Electric Company, Schenectady, NY (US)

( * ) Notice: Subject to any disclaimer, the term of this patent is extended or adjusted under 35 U.S.C. 154(b) by 729 days.

(21) Appl. No.: 17/097,295

(22) Filed: Nov. 13, 2020

(65) Prior Publication Data

US 2021/0146480 A1    May 20, 2021

Related U.S. Application Data

(60) Provisional application No. 62/935,736, filed on Nov. 15, 2019.

(51) Int. Cl.
*G01M 99/00* (2011.01)
*B23K 26/342* (2014.01)
(Continued)

(52) U.S. Cl.
CPC .......... *B23K 26/342* (2015.10); *B23K 31/003* (2013.01); *B23K 31/125* (2013.01);
(Continued)

(58) Field of Classification Search
CPC .... B33Y 50/02; B23K 31/003; B23K 31/125; G08B 21/187
See application file for complete search history.

(56) References Cited

U.S. PATENT DOCUMENTS 6,363,503 B1 * 3/2002 Clauss ................ G06F 11/0706
                                                                  714/57
9,724,876 B2   8/2017 Cheverton et al.
(Continued)

OTHER PUBLICATIONS

European Extended Search Report for EP Application No. 20204894.8 dated Apr. 20, 2021 (9 pages).

*Primary Examiner* — Hoi C Lau
(74) *Attorney, Agent, or Firm* — Dinsmore & Shohl LLP

(57) ABSTRACT

A system for diagnosing an additive manufacturing device is provided. The system includes one or more processors, one or more non-transitory memory modules communicatively coupled to the one or more processors and storing machine-readable instructions. The machine-readable instructions, when executed, cause the one or more processors to: determine parameters associated with at least one subsystem of the additive manufacturing device, the parameters being related to a build generated by the additive manufacturing device; compare the parameters with threshold values; and determine a failure mode, among a plurality of failure modes, associated with a subsystem of the at least one subsystem of the additive manufacturing device based on the comparison of the parameters with the threshold values.

20 Claims, 13 Drawing Sheets

(51) Int. Cl.
*B23K 31/00* (2006.01)
*B23K 31/12* (2006.01)
*B33Y 50/02* (2015.01)
*G08B 21/18* (2006.01)

(52) U.S. Cl.
CPC .......... *B33Y 50/02* (2014.12); *G01M 99/005* (2013.01); *G08B 21/187* (2013.01)

(56) References Cited

U.S. PATENT DOCUMENTS

| | | |
|---|---|---|
| 11,407,179 B2 * | 8/2022 | Jayawickrema ...... B29C 64/153 |
| 11,409,261 B2 * | 8/2022 | Kothari ................. B29C 64/386 |
| 2003/0101261 A1 * | 5/2003 | Ikeda ...................... H04L 41/06 |
| | | 709/224 |
| 2010/0238043 A1 * | 9/2010 | Wakamiya .......... G06F 11/0772 |
| | | 340/691.6 |
| 2016/0155315 A1 * | 6/2016 | McElhinney ......... G06F 11/008 |
| | | 340/502 |
| 2017/0246810 A1 * | 8/2017 | Gold ..................... B29C 64/386 |
| 2018/0114126 A1 | 4/2018 | Das et al. |
| 2019/0018400 A1 * | 1/2019 | McCann ............ G05B 23/0221 |
| 2019/0056717 A1 * | 2/2019 | Kothari ................... B22F 10/85 |
| 2019/0134748 A1 * | 5/2019 | Roychowdhury ... B23K 26/342 |
| 2020/0298498 A1 * | 9/2020 | Jayawickrema ........ G06F 30/00 |
| 2021/0146480 A1 * | 5/2021 | Srivatsa ................. B22F 10/85 |

* cited by examiner

SYSTEMS, AND METHODS FOR DIAGNOSING AN ADDITIVE MANUFACTURING DEVICE

CROSS REFERENCE TO RELATED APPLICATIONS

This application claims benefits of U.S. Provisional Application No. 62/935,736 filed on Nov. 15, 2019, the entire contents of which are herein incorporated by reference.

FIELD

The present disclosure relates to systems, and methods for diagnosing an additive manufacturing device and additive processes, and more specifically, for diagnosing a failure mode for subsystems of the additive manufacturing device based on threshold values obtained based on machine learning or statistical models.

BACKGROUND

In additive manufacturing processes such as electron-beam melting of a powder layer to create an article, there exist some challenges to diagnose aborted or failed builds or identify performance issues of an additive manufacturing device. Specifically, an expert has to manually diagnose a build or the device, which not only takes a lot of time but also requires human labor. In addition, finding a root cause of a failure of the additive manufacturing device is a difficult and time-consuming process. Thus, it may be necessary to diagnose a failure of the additive manufacturing device with reduced time and find an exact cause for the failure of the additive manufacturing device.

SUMMARY

In an embodiment, a system for diagnosing an additive manufacturing device is provided. The system includes one or more processors, one or more non-transitory memory modules communicatively coupled to the one or more processors and storing machine-readable instructions. The machine-readable instructions, when executed, cause the one or more processors to: determine parameters associated with at least one subsystem of the additive manufacturing device, the parameters being related to a build generated by the additive manufacturing device; compare the parameters with threshold values; and determine a failure mode, among a plurality of failure modes, associated with a subsystem of the at least one subsystem of the additive manufacturing device based on the comparison of the parameters with the threshold values.

In an embodiment, a method for diagnosing an additive manufacturing device is provided. The method includes determining parameters associated with at least one subsystem of an additive manufacturing device, the parameters being related to a build generated by the additive manufacturing device, comparing the parameters with threshold values, and determining a failure mode, among a plurality of failure modes, associated with a subsystem of the at least one subsystem of the additive manufacturing device based on the comparison of the parameters with the threshold values.

In an embodiment, a non-transitory machine readable media includes computer executable instructions, when executed by one or more processors, configured to cause the one or more processors to: determine parameters associated with at least one subsystem of an additive manufacturing device, the parameters being related to a build generated by the additive manufacturing device, compare the parameters with threshold values, and determine a failure mode, among a plurality of failure modes, associated with a subsystem of the at least one subsystem of the additive manufacturing device based on the comparison of the parameters with the threshold values.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

Figure 6:
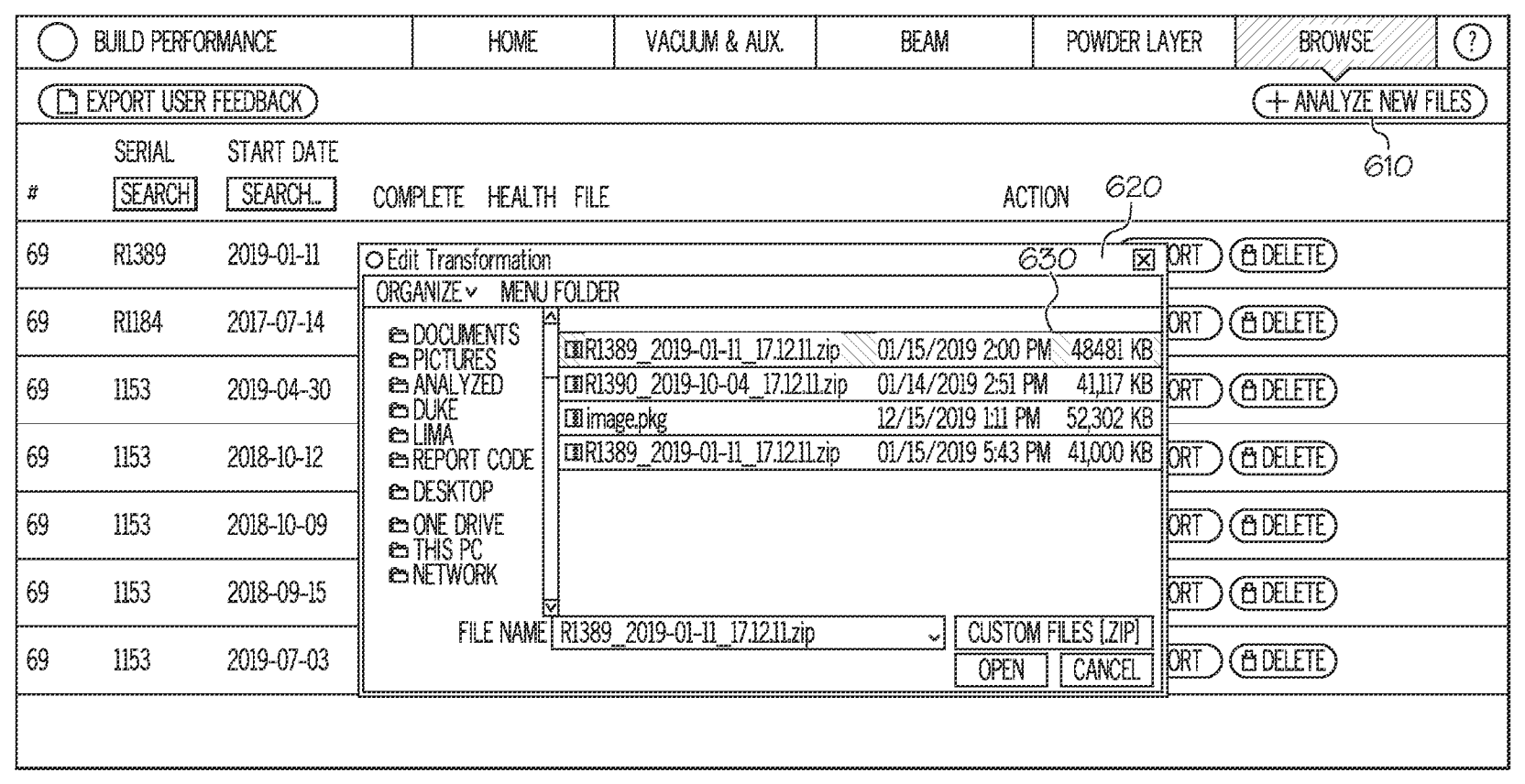

FIG. 6 depicts a user interface allowing a user to retrieve a log file, according to one or more embodiments show and described herewith;

Figure 9:
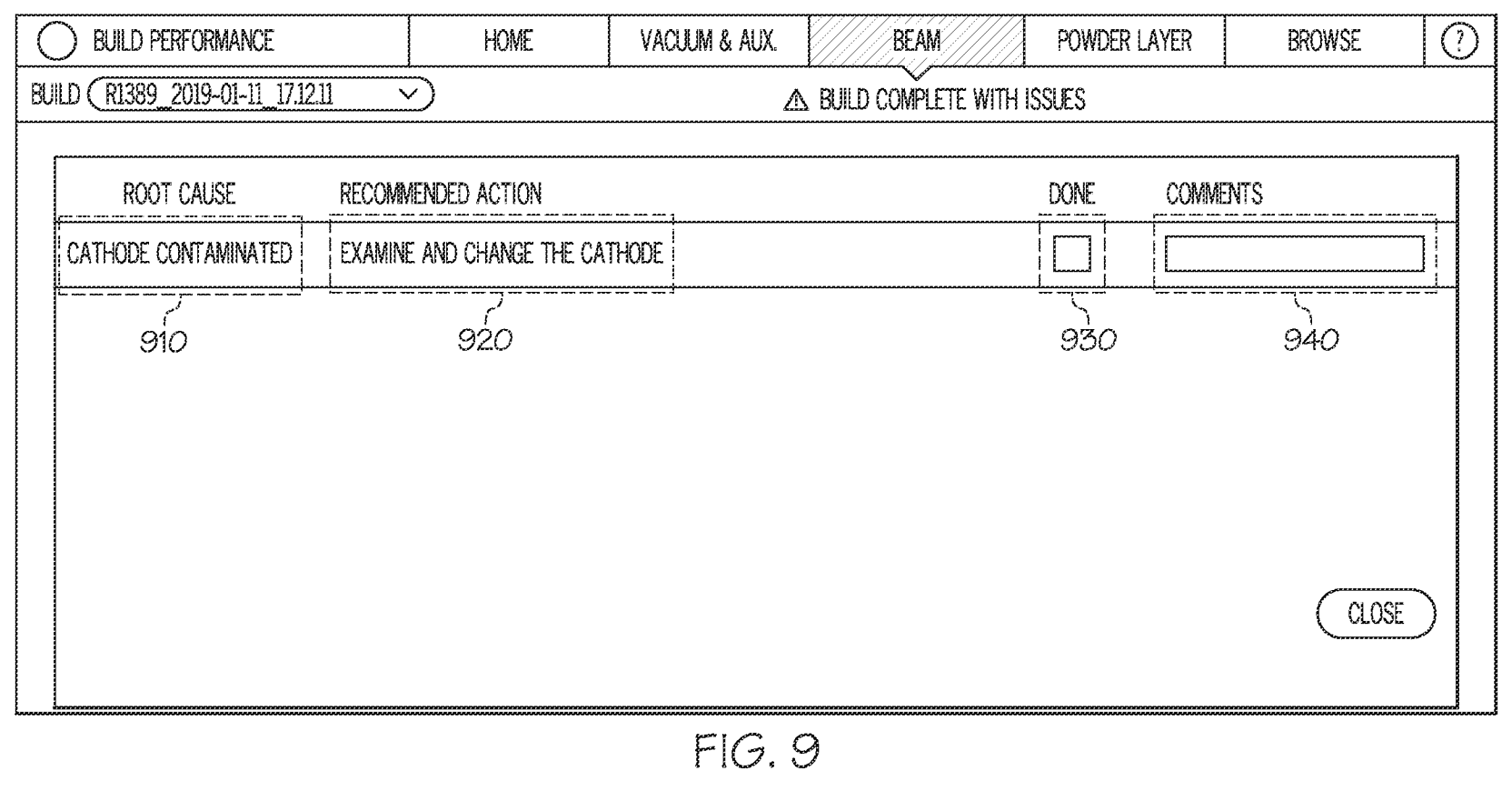

FIG. 9 depicts a user interface displaying root cause and recommended actions for a failure mode, according to one or more embodiments show and described herewith;

DETAILED DESCRIPTION

Figure 1:
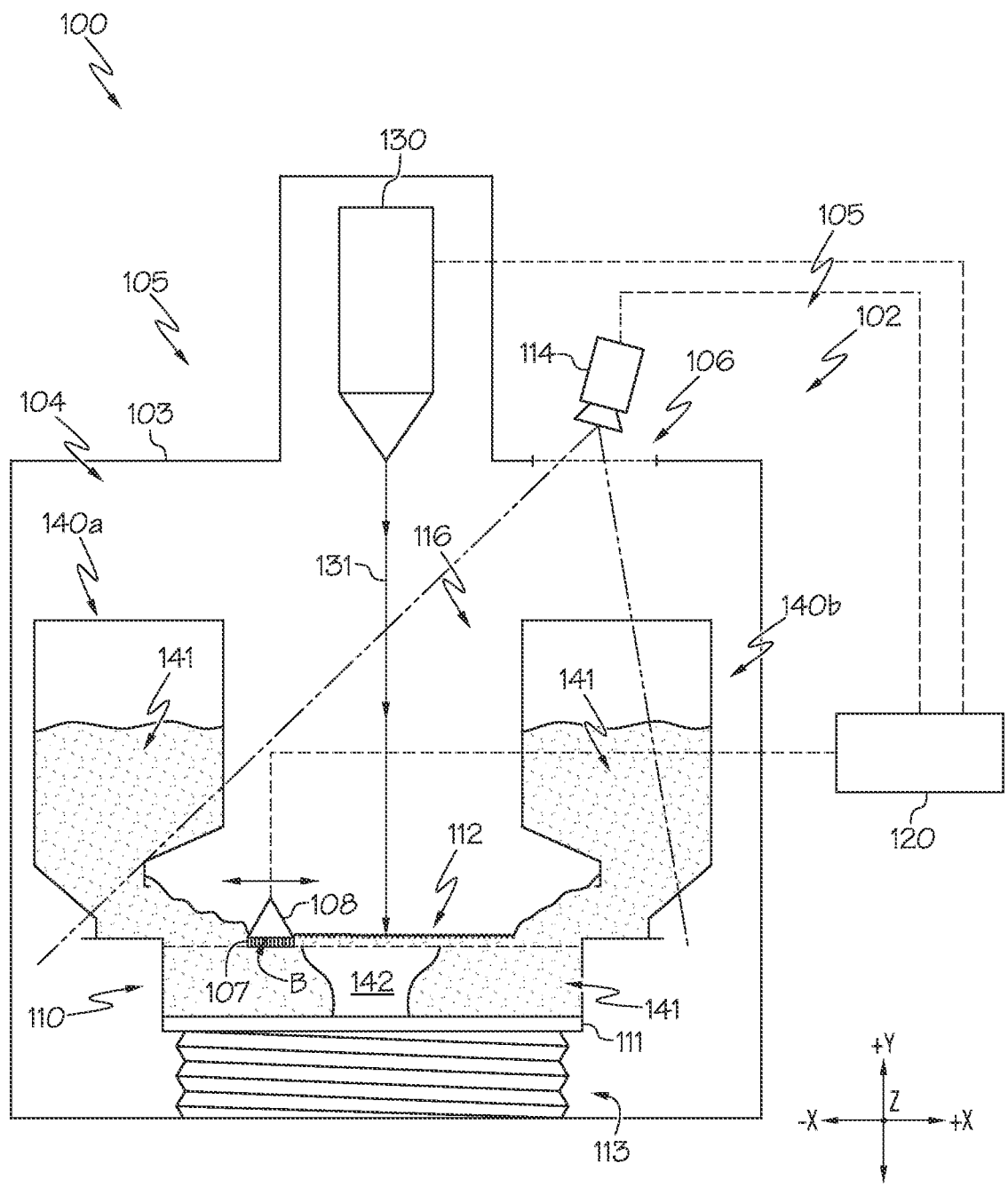
FIG. 1 depicts an additive manufacturing system of the present disclosure, according to one or more embodiments shown and described herewith.

The present disclosure generally relates to devices, systems, and methods for diagnosing an additive manufacturing device. The systems and methods determine parameters associated with at least one subsystem of the additive manufacturing device, compare the parameters with threshold values, and determine a failure mode, among a plurality of failure modes, associated with a subsystem of the at least one subsystem of the additive manufacturing device based on the comparison of the parameters with the threshold values. The analyzed output is visualized through a display device indicating current health status of the additive manufacturing device or subsystems thereof. Accordingly, the present disclosure provides users with a visually interactive interface that provides guided steps in diagnosing build or module level issues in a matter of a few minutes.

Additive manufacturing systems may use an electron-beam or a laser beam to manufacture builds. Additive manufacturing systems may include multiple electron-beam guns or laser designs. Electron-beam additive manufacturing, which may also be known as electron-beam melting (EBM), is a type of additive manufacturing (3D printing) process that is typically used for metallic articles. EBM utilizes a raw material in the form of a metal powder or a metal wire, which is placed under a vacuum (e.g., within a vacuum sealed build chamber). Generally speaking, the raw material is fused together from heating via an electron beam.

Systems that utilize EBM generally obtain data from a 3D computer-aided design (CAD) model and use the data to place successive layers of the raw material using an apparatus to spread the raw material, such as a powder distributor. The successive layers are melted together utilizing a computer-controlled electron beam. As noted above, the process takes place under vacuum within a vacuum sealed build chamber, which makes the process suited to manufacture parts using reactive materials having a high affinity for oxygen (e.g., titanium). In embodiments, the process operates at higher temperatures (up to about 1,200° C.) relative to other additive manufacturing processes, which can lead to differences in phase formation though solidification and solid-state phase transformation.

Direct metal laser melting (DMLM) is an another additive manufacturing process that uses lasers to melt ultra-thin layers of metal powder to build a three-dimensional object. Objects are built directly from a file generated from CAD (computer-aided design) data. The use of a laser to selectively melt thin layers of tiny particles yields objects exhibiting fine, dense and homogeneous characteristics. The DMLM process begins with a roller spreading a thin layer of metal powder on the print bed. Next, a laser is directed based on the CAD data to create a cross-section of the object by completely melting metal particles. The print bed is then lowered so the process can be repeated to create the next object layer. After all the layers are printed, the excess unmelted powder is brushed, blown or blasted away. The object typically requires little, if any, finishing. Embodiments described herein are applicable to other additive manufacturing modalities employing other types of additive manufacturing devices beyond those disclosed herein.

FIG. 1 depicts an additive manufacturing device of the present disclosure, according to one or more embodiments shown and described herewith. As shown in FIG. 1, an additive manufacturing system 100 includes at least a build chamber 102, an imaging device 114, and a control component 120. The build chamber 102 defines an interior 104 that is separated from an exterior environment 105 via one or more chamber walls 103. In some embodiments, at least a portion of the one or more chamber walls 103 of the build chamber 102 may include a window 106 therein. The imaging device 114 is generally located adjacent to the build chamber 102 in the exterior environment 105 (i.e., not located within the interior 104 of the build chamber 102), and is arranged such that a field of view 116 of the imaging device 114 extends through the window 106 into the interior 104 of the chamber.

In some embodiments, the interior 104 of the build chamber 102 may be a vacuum sealed interior such that an article 142 formed within the build chamber 102 is formed under optimal conditions for EBM or DMLM, as is generally understood. The build chamber 102 is capable of maintaining a vacuum environment via a vacuum system. Illustrative vacuum systems may include, but are not limited to, a turbo molecular pump, a scroll pump, an ion pump, and one or more valves, as are generally understood. In some embodiments, the vacuum system may be communicatively coupled to the control component 120 such that the control component 120 directs operation of the vacuum system to maintain the vacuum within the interior 104 of the build chamber 102. In some embodiments, the vacuum system may maintain a base pressure of about $1 \times 10^{-5}$ mbar or less throughout an entire build cycle. In further embodiments, the vacuum system may provide a partial pressure of He or other reactive or inert control gas to about $2 \times 10^{-3}$ mbar during a melting process.

In other embodiments, the build chamber 102 may be provided in an enclosable chamber provided with ambient air and atmosphere pressure. In yet other embodiments, the build chamber 102 may be provided in open air.

The build chamber 102 generally includes within the interior 104 a powder bed 110 supporting a powder layer 112 thereon, as well as a powder distributor 108. In some embodiments, the build chamber 102 may further include one or more raw material hoppers 140a, 140b that maintain raw material 141 therein. In some embodiments, the build chamber 102 may further include an emitter 130. The build chamber 102 may further include other components, particularly components that facilitate EBM or DMLM, including components not specifically described herein.

The powder bed 110 is generally a platform or receptacle located within the interior 104 of the build chamber 102 that is arranged to receive the raw material 141 from the one or more raw material hoppers 140a, 140b. The powder bed 110 is not limited in size or configuration by the present disclosure, but may generally be shaped and sized to hold an amount of the raw material 141 from the raw material hoppers 140a, 140b in the form of the powder layer 112, one or more portions of article 142, and/or unfused raw material 141, as described in greater detail herein.

In some embodiments, the powder bed 110 may include a movable build platform 111 supported by a lifting component 113. The movable build platform 111 may generally be a surface within the powder bed 110 that is movable by the lifting component 113 in a system vertical direction (e.g., in the +y/−y directions of the coordinate axes of FIG. 1) to increase and/or decrease a total volume of the powder bed 110. For example, the movable build platform 111 within the powder bed 110 may be movable by the lifting component 113 in a downward direction (e.g., toward the −y direction of the coordinate axes of FIG. 1) so as to increase the volume of the powder bed 110. In addition, the movable build platform 111 may be movable by the lifting component 113 to add each successive powder layer 112 to the article 142 being formed, as described in greater detail herein.

The lifting component 113 is not limited by the present disclosure, and may generally be any device or system capable of being coupled to the movable build platform 111 and movable to raise or lower the movable build platform 111 in the system vertical direction (e.g., in the +y/−y directions of the coordinate axes of FIG. 1). In some embodiments, the lifting component 113 may utilize a linear actuator type mechanism to effect movement of the movable build platform 111. Illustrative examples of devices or systems suitable for use as the lifting component 113 include, but are not limited to, a scissor lift, a mechanical linear actuator such as a screw based actuator, a wheel and axle actuator (e.g., a rack and pinion type actuator), a hydraulic actuator, a pneumatic actuator, a piezoelectric actuator, an electromechanical actuator, and/or the like. In some embodiments, the lifting component 113 may be located within the build chamber 102. In other embodiments, the lifting component 113 may be only partially located within the build chamber 102, particularly in embodiments where it may be desirable to isolate portions of the lifting component 113 that are sensitive to the harsh conditions (high heat, excessive dust, etc.) within the interior 104 of the build chamber 102.

The powder distributor 108 is generally arranged and configured to lay down and/or spread a layer of the raw material 141 as the powder layer 112 in the powder bed 110 (e.g., on start plate or build platform 111 within the powder bed). That is, the powder distributor 108 is arranged such that movement of the powder distributor 108 is in a horizontal plane defined by the x-axis and the z-axis of the coordinate axes depicted in FIG. 1. For example, the powder distributor 108 may be an arm, rod, or the like that extends a distance in the z direction of the coordinate axes of FIG. 1 over or above the powder bed 110 (e.g., from a first end to a second end of the powder bed 110). In some embodiments, the length of the powder distributor 108 may be longer than a width of the build platform 111 such that the powder layer 112 can be distributed on each position of the build platform 111. In some embodiments, the powder distributor 108 may have a central axis in parallel with a top surface of the build platform 111 (e.g., generally parallel to the +x/−x axis of the coordinate axes of FIG. 1). One or more motors, actuators, and/or the like may be coupled to the powder distributor 108 to effect movement of the powder distributor 108. For example, a rack and pinion actuator may be coupled to the powder distributor 108 to cause the powder distributor 108 to move back and forth over the powder bed in the +x/−x directions of the coordinate axes of FIG. 1, as indicated by the double sided arrow depicted above the powder distributor 108 in FIG. 1. In some embodiments, movement of the powder distributor 108 may be continuous (e.g., moving without stopping, other than to change direction). In other embodiments, movement of the powder distributor 108 may be stepwise (e.g., moving in a series of intervals). In yet other embodiments, movement of the powder distributor 108 may be such that a plurality of interruptions occur between periods of movement.

As described in greater detail herein, the powder distributor may further include one or more teeth (e.g., rake fingers or the like) that extend from the powder distributor 108 into the raw material 141 from the raw material hoppers 140a, 140b to cause disruption of the raw material 141 when the powder distributor 108 moves (e.g., to distribute the raw material 141, to spread the powder layer 112, etc.).

In embodiments, the powder distributor 108 includes a plurality of rake teeth 107 extending from a bottom surface B of the powder distributor 108 (e.g., extending generally towards the −y direction of the coordinate axes of FIG. 1). In some embodiments, the rake teeth 107 may extend in a direction that is substantially perpendicular to a plane of the build platform 111 (e.g., perpendicular to the plane formed by the x-axis and z-axis of the coordinate axes depicted in FIG. 1). In another embodiment, the rake teeth 107 may be slanted with respect to the build platform 111. An angle a of the slanted rake teeth 107 with respect to a normal to the build platform may be any value, and in some embodiments is between about 0 and about 45°.

In some embodiments, each one of the plurality of rake teeth 107 may be a metal foil or a metal sheet. The total length of the plurality of rake teeth 107 may be longer than a width of the build platform 111 in order to make it possible to distribute powder on each position of the build platform 111. The rake teeth 107 may be shaped and sized to rake through the raw material 141 to distribute the powder layer 112 on the build platform 111. Some embodiments may not include rake teeth 107.

It should be understood that while the powder distributor 108 described herein generally extends a distance in the x direction of the coordinate axes depicted in FIG. 1 and moves in the +x/−x directions of the coordinate axes depicted in FIG. 1 to spread the powder layer 112 as described above, this is merely one illustrative example. Other configurations are also contemplated. For example, the powder distributor 108 may rotate about an axis to spread the powder layer 112, may articulate about one or more joints or the like to spread the powder layer 112, and/or the like without departing from the scope of the present disclosure.

In some embodiments, a cross section of the powder distributor 108 may be generally triangular, as depicted in FIG. 1. However, it should be understood that the cross section may be any shape, including but not limited to, circular, elliptical, quadratic, rectangular, polygonal or the like. A height of the powder distributor 108 may be set in order to give the powder distributor 108 a particular mechanical strength in the system vertical direction (e.g., along the +y/−y axis of the coordinate axes of FIG. 1). That is, in some embodiments, the powder distributor 108 may have a particular controllable flex in the system vertical direction. The height of the powder distributor may also be selected taking into account that the powder distributor 108 pushes an amount of the raw material 141. If the height of the powder distributor 108 is too small, the powder distributor 108 can only push forward a smaller amount relative to a higher power powder distributor 108. However, if the height of the powder distributor 108 is too high, the powder distributor 108 may complicate the powder catching from a scree of powder, (e.g., the higher the height of the powder distributor 108, the more force may be required in order to catch a predetermined amount of powder from the scree of powder by moving the powder distributor 108 into the scree of powder and letting a predetermined amount of powder fall over the top of the powder distributor 108 from a first side in the direction of travel into the scree of powder to a second side in the direction of the build platform 111). In still yet other embodiments, the height of the powder distributor 108 may be such that areas adjacent to both a leading edge and a trailing edge of the powder distributor 108 are within a field of view 116 of the imaging device 114, as described herein.

In some embodiments, the powder distributor 108 may be communicatively coupled to the control component 120, as depicted by the dashed line in FIG. 1 between the powder distributor 108 and the control component 120. As used herein, the term "communicatively coupled" generally refers to any link in a manner that facilitates communications. As such, "communicatively coupled" includes both wireless and wired communications, including those wireless and wired communications now known or later developed. As the powder distributor 108 is communicatively coupled to the control component 120, the control component 120 may transmit one or more signals, data, and/or the like to cause the powder distributor 108 to move, change direction, change speed, and/or the like. For example, a "reverse direction" signal transmitted by the control component 120 to the powder distributor 108 may cause the powder distributor 108 to reverse the direction in which it is moving (e.g., reverse movement in the +x direction to movement in the −x direction).

Each of the raw material hoppers 140a, 140b may generally be containers that hold an amount of the raw material 141 therein and contain an opening to dispense the raw material 141 therefrom. While FIG. 1 depicts two raw material hoppers 140a, 140b, the present disclosure is not limited to such. That is, any number of raw material hoppers may be utilized without departing from the scope of the present disclosure. Further, while FIG. 1 depicts the raw material hoppers 140a, 140b as being located within the interior 104 of the build chamber 102, the present disclosure is not limited to such. That is, the raw material hoppers 140a, 140b may be located outside or partially outside the build chamber 102 in various other embodiments. However, it should be understood that if a raw material hopper is located outside or partially outside the build chamber 102, one or more outlets of the raw material hoppers that supply the raw material 141 may be selectively sealed when not distributing the raw material 141 in order to maintain the vacuum within the build chamber 102.

The shape and size of the raw material hoppers 140a, 140b are not limited by the present disclosure. That is, the raw material hoppers 140a, 140b may generally have any shape and or size without departing from the scope of the present disclosure. In some embodiments, each of the raw material hoppers 140a, 140b may be shaped and or sized to conform to the dimensions of the build chamber 102 such that the raw material hoppers 140a, 140b can fit inside the build chamber. In some embodiments, the raw material hoppers 140a, 140b may be shaped and sized such that a collective volume of the raw material hoppers 140a, 140b is sufficient to hold an amount of raw material 141 that is necessary to fabricate the article 142, which includes a sufficient amount of material to form each successive powder layer 112 and additional material that makes up the unfused raw material 141.

The raw material hoppers 140a, 140b may generally have an outlet for ejecting the raw material 141 located within the raw material hoppers 140a, 140b such that the raw material 141 can be spread by the powder distributor 108, as described herein. In some embodiments, such as the embodiment depicted in FIG. 1, the raw material 141 may freely flow out of the raw material hoppers 140a, 140b under the force of gravity, thereby forming piles or scree of raw material 141 for the powder distributor 108 to spread. In other embodiments, the outlets of the raw material hoppers 140a, 140b may be selectively closed via a selective closing mechanism so as to only distribute a portion of the raw material 141 located within the respective raw material hoppers 140a, 140b at a particular time. The selective closing mechanisms may be communicatively coupled to the control component 120 such that data and/or signals transmitted to/from the control component 120 can be used to selectively open and close the outlets of the raw material hoppers 140a, 140b.

The raw material 141 contained within the raw material hoppers 140a, 140b and used to form the article 142 is not limited by the present disclosure, and may generally be any raw material used for EBM or DMLM now known or later developed. Illustrative examples of raw material 141 includes, but is not limited to, pure metals such as titanium, aluminum, tungsten, or the like; and metal alloys such as titanium alloys, aluminum alloys, stainless steel, cobalt-chrome alloys, cobalt-chrome-tungsten alloys, nickel alloys, and/or the like. Specific examples of raw material 141 include, but are not limited to, Ti6Al4V titanium alloy, Ti6Al4V ELI titanium alloy, Grade 2 titanium, and ASTM F75 cobalt-chrome (all available from Arcam AB, Molndal, Sweden). Another specific example of raw material 141 is INCONEL® alloy 718 available from Special Metals Corporation (Huntington WV).

In embodiments, the raw material 141 is pre-alloyed, as opposed to a mixture. This may allow classification of EBM or DMLM with selective laser melting (SLM), where other technologies like selective laser sintering (SLS) and direct metal laser sintering (DMLS) require thermal treatment after fabrication. Compared to selective laser melting (SLM) and DMLS, EBM has a generally superior build rate because of its higher energy density and scanning method.

The emitter 130 is generally a device that emits an electron beam (e.g., a charged particle beam), such as, for example, an electron gun, a linear accelerator, or the like. The emitter 130 generates an energy beam 131 that may be used for melting or fusing together the raw material 141 when spread as the powder layer 112 on the build platform 111. In some embodiments, the emitter 130 may include at least one focusing coil, at least one deflection coil and an electron beam power supply, which may be electrically connected to an emitter control unit. In one illustrative embodiment, the emitter 130 generates a focusable electron beam with an accelerating voltage of about 60 kilovolts (kV) and with a beam power in the range of about 0 kilowatts (kW) to about 10 kW. The pressure in the vacuum chamber may be in the range of about $1\times10^{-3}$ mBar to about $1\times10^{-6}$ mBar when building the article 142 by fusing each successive powder layer 112 with the energy beam 131. The emitter 130 may sit in a gun vacuum chamber. The pressure in the gun vacuum chamber may be in the range of about $1\times10^{-4}$ mBar to about $1\times10^{-7}$ mBar. In some embodiments, the emitter 130 may emit a laser beam using direct metal laser melting (DMLM). The emitter 130 may emit laser to melt ultra-thin layers of metal powder to build a three-dimensional object. When using DMLM, a gas flow may be provided over a build in contrast with electron beam melting manufacturing that requires a vacuum chamber.

In some embodiments, the emitter 130 may be communicatively coupled to the control component 120, as indicated in FIG. 1 by the dashed line between the emitter 130 and the control component 120. The communicative coupling of the emitter 130 to the control component 120 may provide an ability for signals and/or data to be transmitted between the emitter 130 and the control component 120, such as control signals from the control component 120 that direct operation of the emitter 130.

Still referring to FIG. 1, the imaging device 114 is generally located in the exterior environment 105 outside the build chamber 102, yet positioned such that the field of view 116 of the imaging device 114 is through the window 106 of the build chamber 102. The imaging device 114 is generally positioned outside the build chamber 102 such that the harsh environment within the interior 104 of the build chamber 102 does not affect operation of the imaging device 114. That is, the heat, dust, metallization, x-ray radiation, and/or the like that occurs within the interior 104 of the build chamber 102 will not affect operation of the imaging device 114. In embodiments, the imaging device 114 is fixed in position such that the field of view 116 remains constant (e.g., does not change). Moreover, the imaging device 114 is arranged in the fixed position such that the field of view 116 of the imaging device 114 encompasses an entirety of the powder bed 110. That is, the imaging device 114 is capable of imaging the entire powder bed 110 within the build chamber 102 through the window 106.

In some embodiments, the imaging device 114 is a device particularly configured to sense electromagnetic radiation, particularly heat radiation (e.g., thermal radiation) that is generated by the various components within the powder bed 110 (e.g., the powder layer 112, the raw material 141, and/or the article 142). Thus, the imaging device 114 may generally be a device particularly tuned or otherwise configured to obtain images in spectra where heat radiation is readily detected, such as the visible spectrum and the infrared spectrum (including the far infrared and the near infrared spectrum). As such, one illustrative example of a device particularly tuned or otherwise configured to obtain images in spectra where heat radiation includes, but is not limited to, an infrared camera. In some embodiments, the imaging device 114 may be a camera that is sensitive within a range of wavelengths of about 1 micrometer($\mu$m) to about 14 $\mu$m, including about 1 $\mu$m, about 2 $\mu$m, about 3 $\mu$m, about 4 $\mu$m, about 5 $\mu$m, about 6 $\mu$m, about 7 $\mu$m, about 8 $\mu$m, about 9 $\mu$m, about 10 $\mu$m, about 11 $\mu$m, about 12 $\mu$m, about 13 $\mu$m, about 14 $\mu$m, or any value or range between any two of these values (including endpoints). As such, the imaging device 114 is suitable for imaging temperatures which occur during EBM or DMLM of the powder layer 112. In some embodiments, the wavelength sensitivity of the imaging device 114 may be selected in accordance with the type of raw material used. Illustrative examples of suitable devices that may be used for the imaging device 114 include, but are not limited to, an IR-camera (Infrared-camera), NIR-camera (Near Infrared-camera), a VISNIR-camera (Visual Near Infrared-camera), a CCD camera (Charged Coupled Device-camera), and a CMOS-camera (Complementary Metal Oxide Semiconductor-camera).

In some embodiments, the imaging device 114 may be an area scan camera that is capable of providing data specific to one or more regions of interest within the field of view 116, including regions of interest that move within the field of view 116. That is, an area scan camera includes a matrix of pixels that allows the device to capture a 2D image in a single exposure cycle with both vertical and horizontal elements. Area scan cameras can further be used to obtain a plurality of successive images, which is useful when selecting regions of interest within the field of view 116 and observing a change in the regions of interest, as described in greater detail herein. Illustrative examples of such area scan cameras include those available from Basler AG (Ahrensburg, Germany), JAI Ltd. (Yokohama, Japan), National Instruments (Austin, TX), and Stemmer Imaging (Puchheim, Germany).

In some embodiments, the imaging device 114 may have a monochrome image sensor. In other embodiments, the imaging device 114 may have a color image sensor. In various embodiments, the imaging device 114 may include one or more optical elements, such as lenses, filters, and/or the like. In a particular embodiment, the imaging device 114 may include a Bayer filter. As is generally understood, a Bayer filter is a color filter array (CFA) for arranging RGB color filters on a square grid of photosensors to create a color image, such as a filter pattern of about 50% green, about 25% red, and about 25% blue.

In some embodiments, the imaging device 114 may further be a device particularly configured to provide signals and/or data corresponding to the sensed electromagnetic radiation to the control component 120. As such, the imaging device 114 may be communicatively coupled to the control component 120, as indicated by the dashed lines depicted in FIG. 1 between the imaging device 114 and the control component 120.

It should be understood that, by locating the imaging device 114 in the exterior environment 105 outside the interior 104 of the build chamber 102, it is possible to easily retrofit existing build chambers having windows in the chamber walls 103 therein with a kit that includes the imaging device 114 so as to upgrade the existing build chambers with the capabilities described herein.

The control component 120 is generally a device that is communicatively coupled to one or more components of the additive manufacturing system 100 (e.g., the powder distributor 108, the imaging device 114, and/or the emitter 130) and is particularly arranged and configured to transmit and/or receive signals and/or data to/from the one or more components of the additive manufacturing system 100.

Figure 2:
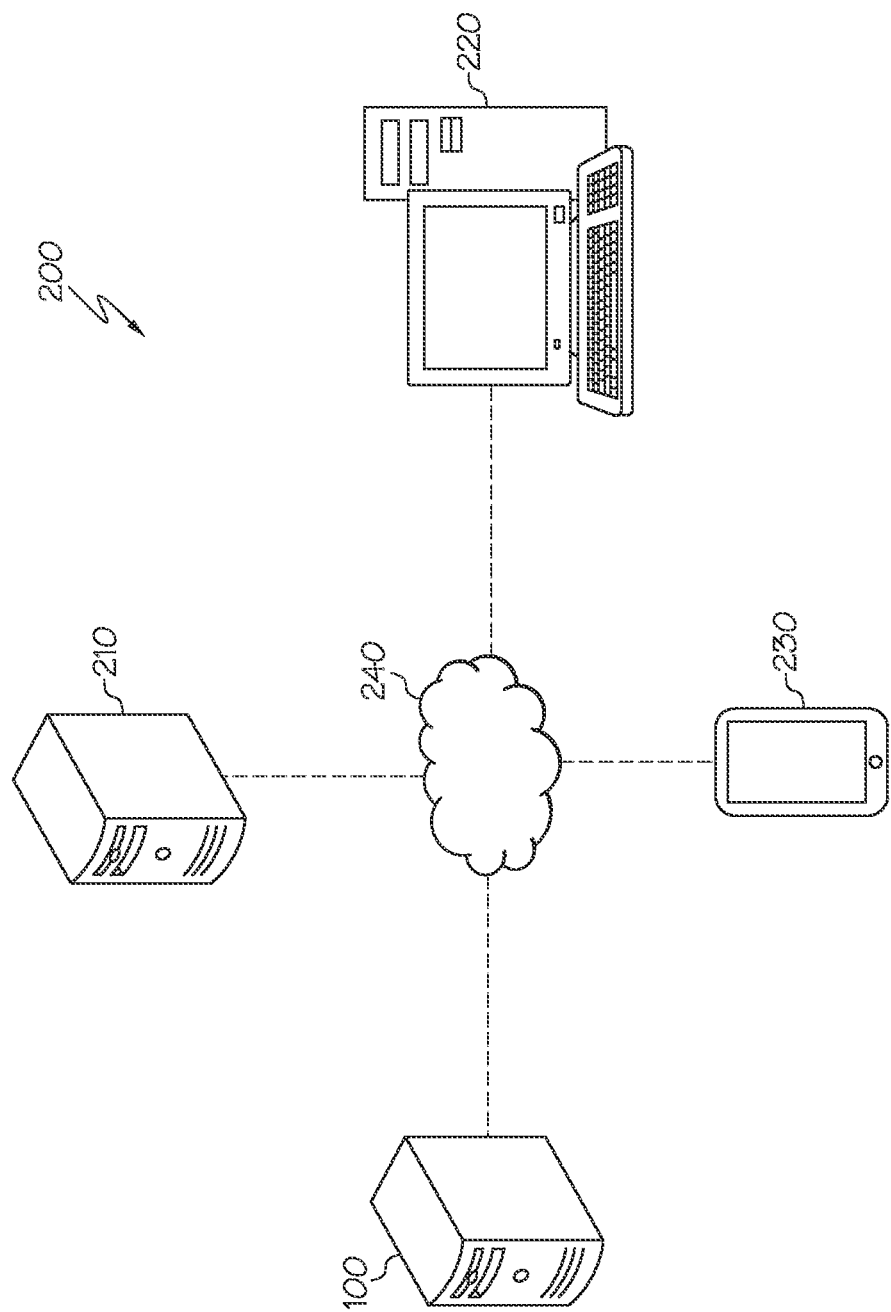
FIG. 2 is a block diagram of an exemplary system according to one or more embodiments shown and described herein.

FIG. 2 is a block diagram of an exemplary system 200 according to one or more embodiments shown and described herein. In embodiments, the system 200 may include the additive manufacturing system 100, a server 210, a user computing device 220, and a mobile computing device 230. The additive manufacturing system 100 may be communicatively coupled to the server 210, the user computing device 220, and the mobile computing device 230 by a network 240. In embodiments, the network 240 may include one or more computer networks (e.g., a personal area network, a local area network, or a wide area network), cellular networks, satellite networks and/or a global positioning system and combinations thereof. Accordingly, the user computing device 220 can be communicatively coupled to the network 240 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

In embodiments, the additive manufacturing system 100 may transmit captured images and/or log files related to builds to the server 210, the user computing device 220, and/or the mobile computing device 230. The log files may include a plurality of parameters that are output from a plurality of subsystems of the additive manufacturing system 100 such as a vacuum system, a beam system, a powder layering system, and the like. The plurality of parameters may be raw parameters output from the additive manufacturing system 100, or parameters further processed based on machine operations. For example, parameters may be processed based on domain knowledge and or physics to generate new features and/or parameters. The image data and/or log files may be stored in the server 210, the user computing device 220, and/or the mobile computing device 230.

The server 210 generally includes processors, memory, and chipsets for delivering resources via the network 240. Resources may include providing, for example, processing, storage, software, and information from the server 260 to the user computing device 220 via the network 240. The server 210 may store machine learning models or statistical models on parameters from the additive manufacturing system 100.

The user computing device 220 generally includes processors, memory, and chipsets for communicating data via the network 240. The details of the user computing device 220 will be described below with reference to FIG. 4.

The mobile computing device 230 may be any device having hardware (e.g., chipsets, processors, memory, etc.) for communicatively coupling with the network 240. Specifically, the mobile computing device 230 may include an antenna for communicating over one or more of the wireless computer networks described above. Moreover, the mobile computing device 230 may include a mobile antenna for communicating with the network 240. Accordingly, the mobile antenna may be configured to send and receive data according to a mobile telecommunication standard of any generation (e.g., 1G, 2G, 3G, 4G, 5G, etc.). Specific examples of the mobile computing device 230 include, but are not limited to, smart phones, tablet devices, e-readers, laptop computers, or the like. The mobile computing device 230 may have a display similar to the display device 408 of the user computing device 220 and display user interfaces, e.g., interfaces illustrated in FIGS. 6, 8-9, and 11-13.

The network 240 generally includes a plurality of base stations that are configured to receive and transmit data according to mobile telecommunication standards. The base stations are further configured to receive and transmit data over wired systems such as public switched telephone network (PSTN) and backhaul networks. The network 240 may further include any network accessible via the backhaul networks such as, for example, wide area networks, metropolitan area networks, the Internet, satellite networks, or the like. Thus, the base stations generally include one or more antennas, transceivers, and processors that execute machine readable instructions to exchange data over various wired and/or wireless networks.

Figure 3:
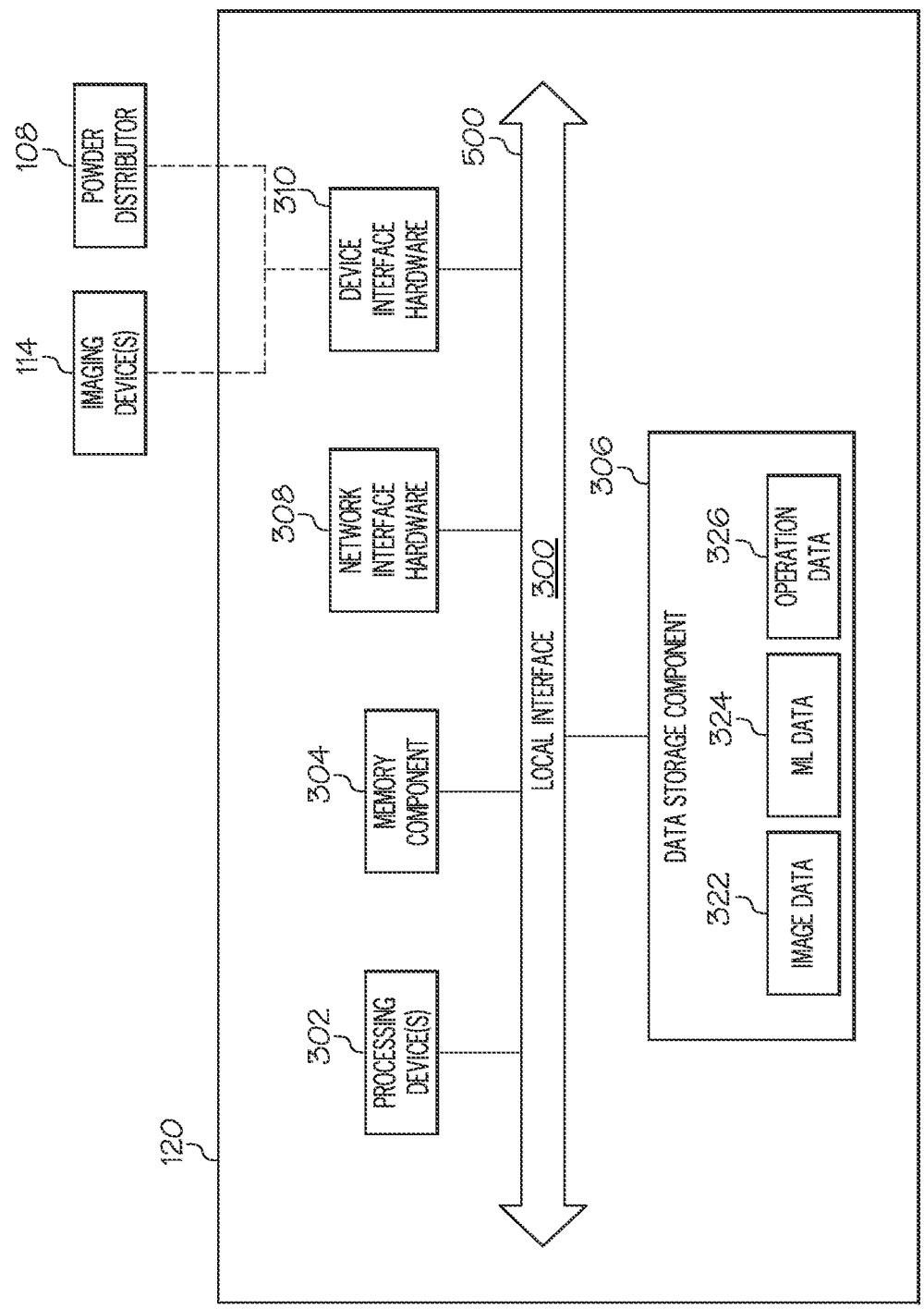
FIG. 3 depicts various internal components of a control component of an additive manufacturing system, according to one or more embodiments shown and described herein.

Turning to FIG. 3, the various internal components of the control component 120 depicted in FIG. 1 are shown. Particularly, FIG. 3 depicts various system components for collecting parameters and images for operating the additive manufacturing system 100, analyzing parameters and image data and/or assisting with the control of various components of the additive manufacturing system 100 depicted in FIG. 1.

As illustrated in FIG. 3, the control component 120 may include one or more processing devices 302, a non-transitory memory component 304, network interface hardware 308, device interface hardware 310, and a data storage component 306. A local interface 300, such as a bus or the like, may interconnect the various components.

The one or more processing devices 302, such as a computer processing unit (CPU), may be the central processing unit of the control component 120, performing calculations and logic operations to execute a program. The one or more processing devices 302, alone or in conjunction with the other components, are illustrative processing devices, computing devices, processors, or combinations thereof. The one or more processing devices 302 may include any processing component configured to receive and execute instructions (such as from the data storage component 306 and/or the memory component 304).

The memory component 304 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 304 may include one or more programming instructions thereon that, when executed by the one or more processing devices 302, cause the one or more processing devices 302 to complete various processes.

Still referring to FIG. 3, the programming instructions stored on the memory component 304 may be embodied as a plurality of software logic modules, where each logic module provides programming instructions for completing one or more tasks.

Still referring to FIG. 3, the network interface hardware 308 may include any wired or wireless networking hardware, such as a modem, LAN port, wireless fidelity (Wi-Fi) card, WiMax card, mobile communications hardware, and/or other hardware for communicating with other networks and/or devices. For example, the network interface hardware 308 may be used to facilitate communication between the additive manufacturing system 100 and external devices such as the server 210, the user computing device 220, the mobile computing device 230 and the like via a network 240 as shown in FIG. 2.

The device interface hardware 310 may communicate information between the local interface 300 and one or more components of the additive manufacturing system 100 of FIG. 1. For example, the device interface hardware 310 may act as an interface between the local interface 300 and the imaging device 114 of FIG. 1, the powder distributor 108, and/or the like. In some embodiments, the device interface hardware 310 may transmit or receive signals and/or data to/from the imaging device 114 of FIG. 1.

Still referring to FIG. 3, the data storage component 306, which may generally be a storage medium, may contain one or more data repositories for storing data that is received and/or generated. The data storage component 306 may be any physical storage medium, including, but not limited to, a hard disk drive (HDD), memory, removable storage, and/or the like. While the data storage component 306 is depicted as a local device, it should be understood that the data storage component 306 may be a remote storage device, such as, for example, a server computing device, cloud based storage device, or the like. Illustrative data that may be contained within the data storage component 306 includes, but is not limited to, image data 322, machine learning (ML) data 324, and/or operation data 326. The image data 322 may generally be data that is used by the control component 120 to recognize particular objects, determine one or more points on the powder layer 112 (FIG. 1), monitor an amount of electromagnetic radiation at the one or more points, determine a change in electromagnetic radiation, and/or the like. For example, the control component 120 may access the image data 322 to obtain a plurality of images received from the imaging device 114, determine an amount of electromagnetic radiation from the image data 322, and generate one or more commands accordingly.

Still referring to FIG. 3, the ML data 324 may be data that is generated as a result of one or more machine learning processes or statistical modelling processes used to determine features of the powder layer 112 (FIG. 1) from the image data 322. Still referring to FIG. 3, the operation data 326 may include parameters output from a plurality of subsystems from the additive manufacturing system 100. For example, the operation data 326 may include parameters output from a vacuum system, a beam system, a powder layering system, and the like. Specifically, parameters for the beam system may include, but not be limited to, a maximum power supply voltage, a minimum power supply voltage, a filament burn time, an average preheat grid voltage, a grid voltage drop after arctrip, an average cathode power, an average effective work function, an average smoke counts, a smoke warning, an average column pressure, the number of arc trips, a maximum deviation in grid voltage, a grid voltage at 2 mA, and the like. Parameters for the vacuum system may include, but not be limited to, a maximum chamber pressure, a minimum chamber pressure, a maximum column pressure, a minimum column pressure, a vacuum failure error, an average variation in chamber vacuum, a minimum helium supply line pressure, an average current in chamber turbo pump, an average current in column turbo pump, a turbo pump idle duration, an average internal circuit temperature, an average incoming cooling water temperature, and the like.

It should be understood that the components illustrated in FIG. 3 are merely illustrative and are not intended to limit the scope of this disclosure. More specifically, while the components in FIG. 3 are illustrated as residing within the control component 120, this is a non-limiting example. In some embodiments, one or more of the components may reside external to the control component 120.

Figure 4:
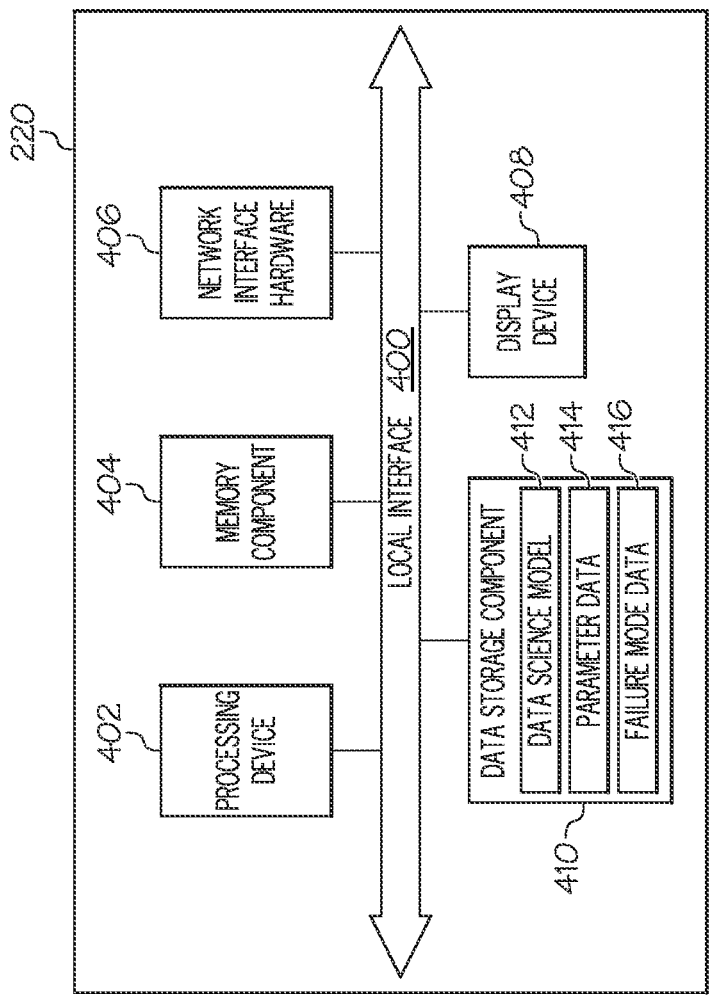
FIG. 4 depicts the various internal components of a user computing device communicating with an additive manufacturing system, according to one or more embodiments shown and described herein.

FIG. 4 depicts the various internal components of the user computing device 220 depicted in FIG. 2. As illustrated in FIG. 4, the user computing device 220 may include one or more processing devices 402, a non-transitory memory component 404, network interface hardware 406, a display device 408, and a data storage component 410. A local interface 400, such as a bus or the like, may interconnect the various components. While FIG. 4 depicts the components of the user computing device 220, the server 210 in FIG. 2 may have the same or similar components as illustrated in FIG. 4.

The one or more processing devices 402, such as a computer processing unit (CPU), may be the central processing unit of the user computing device 220, performing calculations and logic operations to execute a program. The one or more processing devices 402, alone or in conjunction with the other components, are illustrative processing devices, computing devices, processors, or combinations thereof. The one or more processing devices 402 may include any processing component configured to receive and execute instructions (such as from the data storage component 410 and/or the memory component 404).

The memory component 404 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory component 404 may include one or more programming instructions thereon that, when executed by the one or more processing devices 402, cause the one or more processing devices 402 to display information on the display device 408, such as user interface illustrated in FIGS. 6, 8-9, and 11-13.

Still referring to FIG. 4, the display device 408 may include any medium capable of transmitting an optical output such as, for example, a cathode ray tube, a light emitting diode (LED) display, an organic light emitting diode (OLED) display, a liquid crystal display, a plasma display, or the like. In embodiments, the display device 408 may be a touchscreen that, in addition to visually displaying information, detects the presence and location of a tactile input upon a surface of or adjacent to the display device 408.

Still referring to FIG. 4, the data storage component 410, which may generally be a storage medium, may contain one or more data repositories for storing data that is received and/or generated. The data storage component 410 may be any physical storage medium, including, but not limited to, a hard disk drive (HDD), memory, removable storage, and/or the like. While the data storage component 410 is depicted as a local device, it should be understood that the data storage component 410 may be a remote storage device, such as, for example, a server computing device, cloud based storage device, or the like. The data storage component 410 may include, but not be limited to, a data science model 412, parameter data 414, and failure mode data 416.

The data science model 412 is a confidence model obtained from a trained machine learning model or a statistical model. The trained machine learning model or statistical model is a machine learning model or a statistical model trained based on log files including numerous parameters, a list of desired parameters and/or time series data. The data science model 412 may be developed based on four steps: data extractions, data transformation and compression, feature extractions, and feature selections. The data extractions may include extracting time series, events such as process start and end times, and status/error messages related to builds manufactured by the additive manufacturing system 100. The feature extractions may extract features such as statistical features, transient behavior features, abnormal deviations/exceedances, domain (process and machine) based features, and the like related to builds manufactured by the additive manufacturing system 100. The features selection may include selecting statistical analysis methods and machine learning classifiers or statistical model classifiers. The data science model 412 may include threshold parameters for determining a condition of subsystems of the additive manufacturing system 100.

The parameter data 414 may include a plurality of parameters that are output from a plurality of subsystems of the additive manufacturing system 100 such as a vacuum system, a beam system, a powder layering system, and the like. The plurality of parameters may be raw parameters output from the additive manufacturing system 100, or parameters further processed based on machine operations. The parameters may include parameters extracted from the image data 322 of the control component 120.

The failure mode data 416 may include a plurality of failure modes. Each of the failure modes may be associated with one or more of the subsystems of the additive manufacturing system 100. The failure mode may include, but not be limited to, a rake stuck, a cathode contamination or damage, a vacuum failure and the like. The failure mode may include one or more root cause identifications. For example, the failure mode of the cathode contamination or damage may include root causes such as a cathode contamination, an arc trip, or a wrong position of the cathode, and the like. Each of the root causes may be associated with analysis of the parameters of the additive manufacturing system 100. For example, if the parameters of additive manufacturing system 100 indicate lower brightness, a cathode contamination may be determined as a root cause.

Each of the failure modes may be determined based on comparison of the parameters for the additive manufacturing system 100 and threshold parameters stored in the data science model 412.

Figure 5:
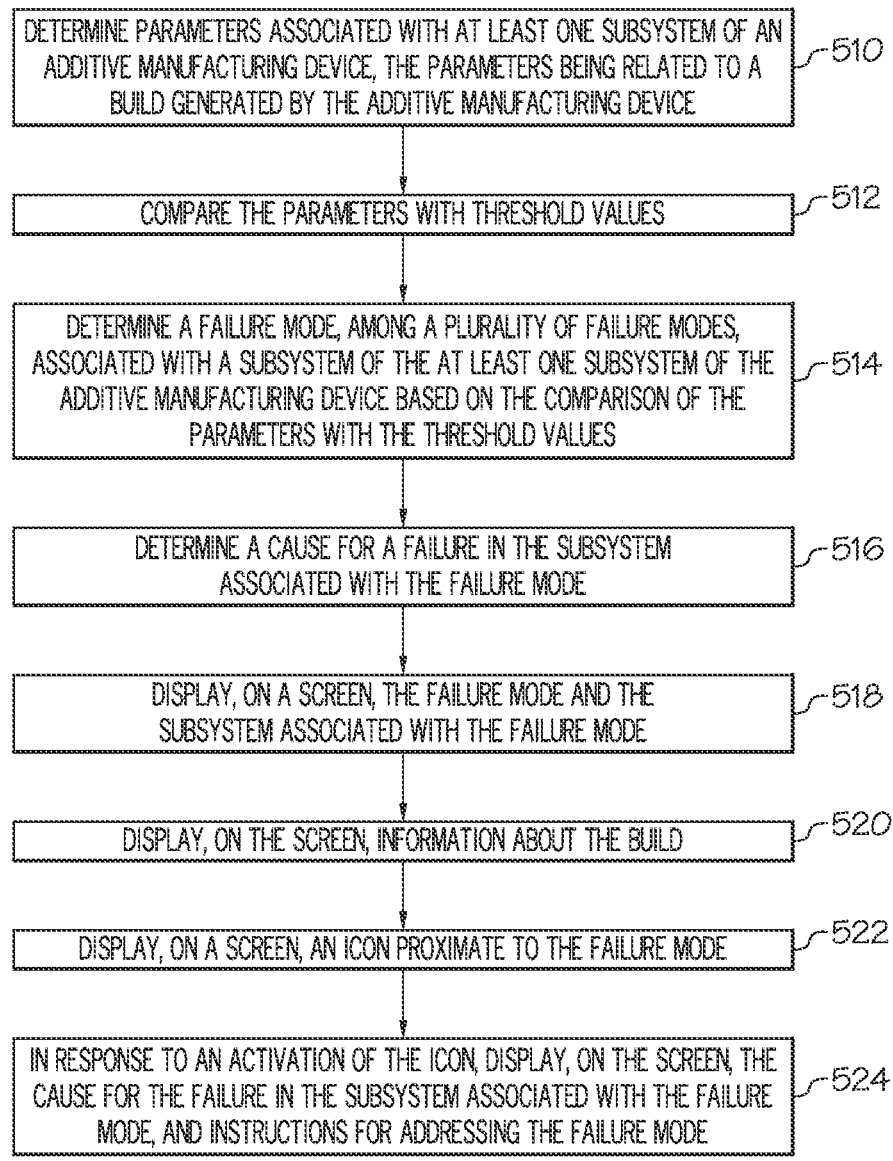
FIG. 5 depicts a flow chart for diagnosing an additive manufacturing system and providing diagnosis results, according to one or more embodiments show and described herewith.

FIG. 5 depicts a flow chart for diagnosing an additive manufacturing device and providing diagnosis results, according to one or more embodiments show and described herewith.

In step 510, a system may determine parameters associated with at least one subsystem of an additive manufacturing device. For example, the processor of the user computing device 220 may determine parameters associated with at least one subsystem of an additive manufacturing system 100. The parameters may be related to a build generated by the additive manufacturing system 100. For example, the parameters may be direct outputs of one or more subsystems of the additive manufacturing system 100. As another example, the parameters may be new parameters further processed based on machine operations. Specifically, the new parameters may be generated by processing raw outputs based on domain knowledge and/or physics.

In embodiments, the processor of the user computing device 220 may receive a request for analyzing a log file for a build and extract parameters associated with subsystems of the additive manufacturing system 100 from the log file. For example, by referring to FIG. 6, the display device 408 of the user computing device 220 may display a screen including an icon 610 for analyzing a new log file. In response to the activation of the icon 610, a window 620 showing a list of log files is displayed. A user may select a log file 630 and request for analyzing the log file. In response, the processor of the user computing device 220 may extract parameters from the log file.

Figure 7A:
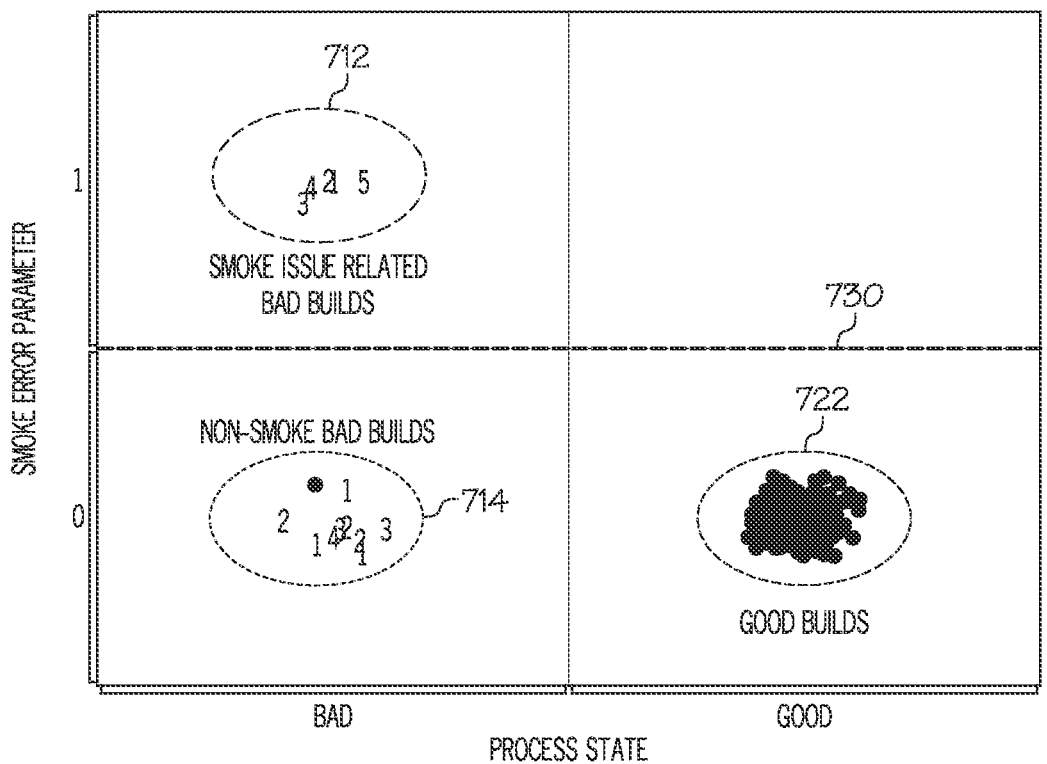
FIG. 7A depicts determining a threshold value for a smoke error parameter based on a set of bad builds and a set of good builds, according to one or more embodiments show and described herewith.
Figure 7B:
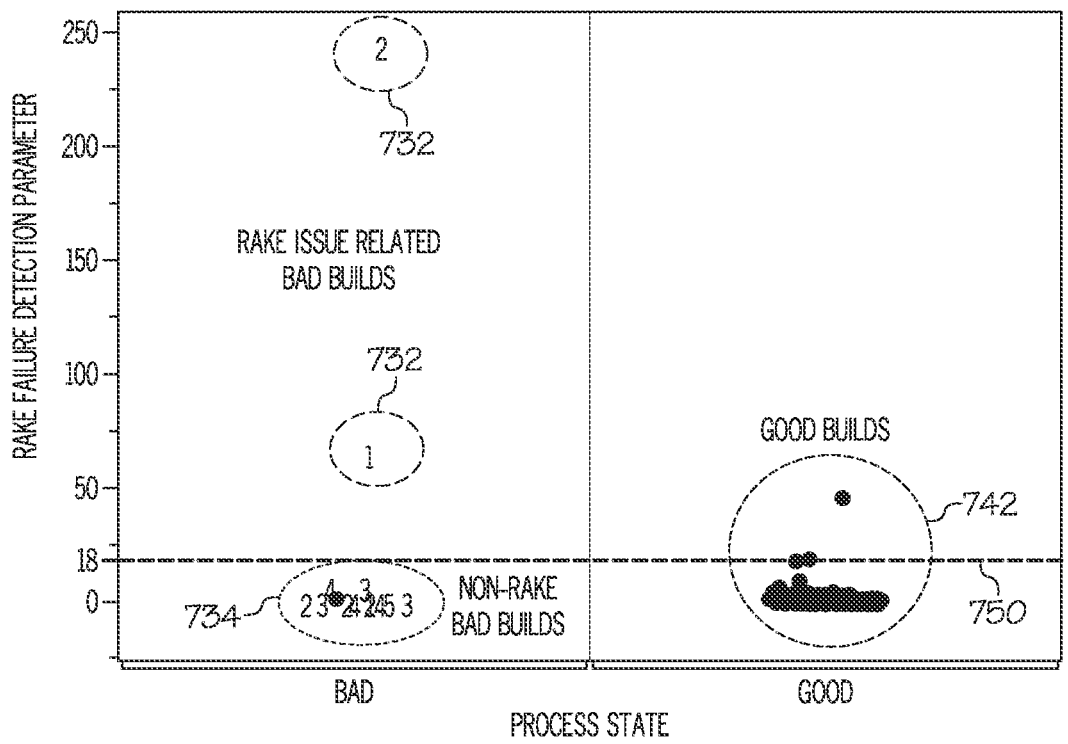
FIG. 7B depicts determining a threshold value for a rake failure detection parameter based on a set of bad builds and a set of good builds, according to one or more embodiments show and described herewith.

Referring back to FIG. 5, in step 512, the processor of the user computing device 220 may compare the parameters with threshold values. The threshold values may be determined based on machine learning or statistical models based on good or bad data, extracted features, and desired modules. For example, by referring to FIG. 7A, a smoke error threshold value may be determined based on good or bad build data, and distinction among bad build data. Specifically, FIG. 7A illustrates a set of good builds 722 associated with smoke error parameters and two sets of bad builds 712 and 714 associated with smoke error parameters. The two sets of bad builds include a set of smoke issue related bad builds 712 and a set of non-smoke related bad builds 714. A value 730 between a set of smoke error parameters for the smoke issue related bad builds 712 and a set of smoke error parameters for non-smoke related bad builds 714 is determined as a threshold value for detecting a smoke error. For example, the value 730 may be 0.5. As another example, by referring to FIG. 7B, a rake failure detection threshold value may be determined based on good or bad build data, and distinction among bad build data. Specifically, FIG. 7B illustrates a set of good builds 742 associated with rake failure detection parameters and two sets of bad builds 732 and 734 associated with rake failure detection parameters. The two sets of bad builds include a set of rake issue related bad builds 732 and a set of non-rake related bad builds 734. A value 750 between a set of rake failure detection parameters for the rake issue related bad builds 732 and a set of rake failure detection parameters for non-rake related bad builds 734 is determined as a threshold value for detecting a rake failure. For example, the value 750 may be 18.

Referring back to FIG. 5, in step 514, the processor of the user computing device 220 may determine a failure mode, among a plurality of failure modes, associated with a subsystem of the at least one subsystem of the additive manufacturing system based on the comparison of the parameters with the threshold values. For example, the user computing device 220 may determine a smoke error parameter from the log file selected by the user. If the smoke error parameter is 0.8, then the smoke error parameter for the build is greater than the threshold value (0.5) for a smoke error shown in FIG. 7A. Then, the processor of the user computing device 220 may determine that a smoke error occurred associated with a beam system of the additive manufacturing system 100. As another example, the user computing device 220 may determine a rake failure detection parameter from the log file selected by the user. If the rake failure detection parameter is 25, the rake failure detection parameter for the build is greater than the threshold value (18) for a rake failure detection shown in FIG. 7B. Then, the processor of the user computing device 220 may determine that a rake failure occurred associated with a powdering layer system of the additive manufacturing system 100.

Referring to FIG. 5, in step 516, the processor of the user computing device 220 may determine a cause for a failure in the subsystem associated with the failure mode. For example, if the failure mode is a rake failure, the cause for the failure may include, but not be limited to, old software, part swelling, or loss of lubrication in the rake mechanism. In embodiments, the processor of the user computing device 220 may determine a cause for a failure based on parameters for the build. For example, if the rake current is relatively high, e.g., greater than 6 ampere, the processor of the user computing device 220 may determine that old software is the cause for the failure mode.

In step 518, the processor of the user computing device 220 may display, on a screen, the failure mode and the subsystem associated with the failure mode. For example, by referring to FIG. 8, the display device 408 of the user computing device 220 may display a page 800 showing windows for three subsystems of the additive manufacturing system 100: a vacuum subsystem window 810, a beam subsystem window 820, and a powder layering subsystem window 830. The processor of the user computing device 220 may determine that the failure mode of cathode contamination has occurred for a build. The display device 408 may display the failure mode 822 of cathode contamination in the beam subsystem window 820. The indication and location of the failure mode 822 is not limited to the indication and location shown in FIG. 8, and any other indication for the failure mode may be displayed at a different location.

Figure 8:
FIG. 8 depicts a user interface displaying status of subsystems of an additive manufacturing system, according to one or more embodiments show and described herewith.

Referring back to FIG. 5, in step 520, the processor of the user computing device 220 may display information about the build being analyzed on the display device 408. For example, as shown in FIG. 8, information about the build is displayed in a window 840. The information about the build may include information about the machine (e.g., serial number, type of machine, etc.), information about the powder utilized, theme information, software information, information related to current layer thickness, information related to target z height, information related to last z height, build start time information, build stop time information, build name information, build envelope identification, heat build platform time, and process time. The vacuum subsystem window 810, the beam subsystem window 820, and the powder layering subsystem window 830 may include the status or failure mode of the vacuum subsystem, the beam subsystem, and the powder layering subsystem associated with the build.

Referring back to FIG. 5, in step 522, the processor of the user computing device 220 may display an icon proximate to the indication of the failure mode on the display device 408. For example, as illustrated in FIG. 8, an icon 824 is displayed on the page 800. A user may click or select the icon 824 on the page 800 to receive additional information about the failure mode. The shape and location of the icon 824 is not limited to the icon 824 shown in FIG. 8, and the icon 824 may have any other shape and may be located at different locations.

Referring back to FIG. 5, in step 524, in response to an activation of the icon 824, the processor of the user computing device 220 may display, on the screen, the cause for the failure in the subsystem associated with the failure mode, and instructions for addressing the failure mode. For example, by referring to FIG. 9, the display device 408 display a screen 900 showing a cause 910 for the failure mode, e.g., "Cathode Contaminated," and instructions 920 for addressing the failure mode, e.g., "Examine and change the cathode." The user may follow the instructions 920 and change the cathode. Once the change is done, the user may check the box 930 to indicate that an action has been taken according to the instructions. The user may also input comments in the box 940 for future reference. The user computing device 220 may track the user's actions, e.g., based on an activation of the box 930 and determine whether the additive manufacturing system 100 operates without the corresponding failure after the action has been taken.

In embodiments, the diagnosing of the additive manufacturing system 100 may be implemented in real time while a build is being manufactured. For example, while the build is being manufactured, parameters such as on-machine sensor signals may be transmitted from the additive manufacturing system 100 to the user computing device 220 in real time, and the user computing device 220 analyzes the parameters to determine any failure mode. In some embodiments, the diagnosing of the additive manufacturing system 100 may be implemented after the build has been manufactured. For example, parameters such as on-machine sensor signals may be included in a log file and transmitted from the additive manufacturing system 100 to the server 210. Subsequently, the user computing device 220 may retrieve the log file and extract parameters from the log file. Then, the user computing device 220 may analyze the extracted parameters to determine a failure mode, and display the failure mode. In some embodiments, after a build is completed, a log file for the build is automatically analyzed, and the analysis result is stored or provided to the user computing device 220.

Figure 10:
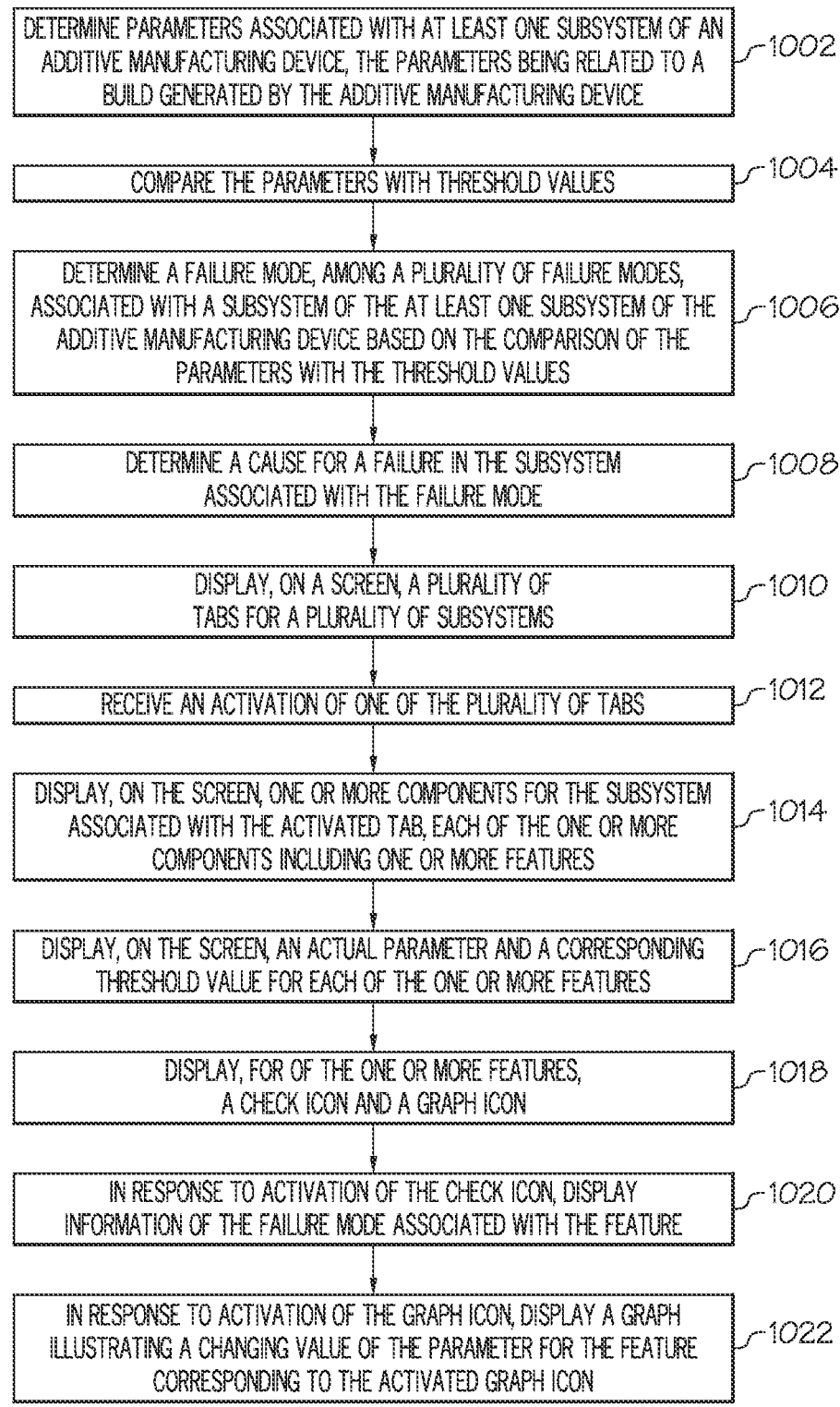
FIG. 10 depicts a flow chart for diagnosing an additive manufacturing system and providing diagnosis results, according to another embodiment show and described herewith.

FIG. 10 depicts a flow chart for diagnosing an additive manufacturing device and providing diagnosis results, according to another embodiment show and described herewith.

In step 1002, a processor of the user computing device 220 may determine parameters associated with at least one subsystem of an additive manufacturing system 100. The parameters may be related to a build generated by the additive manufacturing system 100. For example, the parameters may be direct outputs of one or more subsystems of the additive manufacturing system 100. As another example, the parameters may be new parameters further processed based on machine operations. Specifically, the new parameters may be generated by processing raw outputs based on domain knowledge and/or physics.

In step 1004, the processor of the user computing device 220 may compare the parameters with threshold values. The threshold values may be determined based on machine learning or statistical models on good or bad data, extracted features, and desired modules, as described above with reference to FIGS. 7A and 7B.

In step 1006, the processor of the user computing device 220 may determine a failure mode, among a plurality of failure modes, associated with a subsystem of the at least one subsystem of the additive manufacturing system based on the comparison of the parameters with the threshold values. For example, the user computing device 220 may determine a grid voltage drop after arctrip parameter from the log file selected by the user. If the grid voltage drop after arctrip parameter is greater than a threshold value, the processor of the user computing device 220 may determine that a cathode error occurred associated with a beam system of the additive manufacturing system 100. As another example, the user computing device 220 may determine a column pressure from the log file selected by the user. If the column pressure parameter is greater than a maximum column pressure threshold value, the processor of the user computing device 220 may determine that a vacuum failure occurred associated with a vacuum subsystem of the additive manufacturing system 100.

In step 1008, the processor of the user computing device 220 may determine a cause for a failure in the subsystem associated with the failure mode. For example, if the failure mode is a cathode failure, the cause for the cathode failure may be cathode contamination, arc trip, a wrong position of the cathode, and the like. In embodiments, the processor of the user computing device 220 may determine a cause for a failure based on parameters for the build. For example, if the grid voltage dropped suddenly due to an arc trip, the processor of the user computing device 220 may determine that arc trip is the cause for the failure mode.

In step 1010, the processor of the user computing device 220 may display a plurality of tabs for a plurality of subsystems on the display device 408. For example, by referring to FIG. 11, a tab 1110 for a vacuum subsystem, a tab 1120 for a beam subsystem, and a tab 1130 for a powder layering subsystem may be displayed on the display device 408.

Referring back to FIG. 10, in step 1012, the processor of the user computing device 220 receives an activation of one of the plurality of tabs. For example, a user may click or activate the tab 1120 for the beam system.

In step 1014, the processor of the user computing device 220 displays one or more components for the subsystem associated with the activated tab. Each of the one or more components includes one or more features. For example, by referring to FIG. 11, when the tab 1120 is activated by the user, the display device 408 may display four components associated with the tab 1120: a high voltage power supply component 1122, a cathode health component 1124, a smoke component 1126, and a grid cup status component 1128. Each of the components may include and display one or more features. For example, the cathode health component 1124 may include and display five features: a filament burn time, an average preheat grid voltage, a grid voltage drop after arctrip, an average cathode power, and an average effective work function.

Figure 11:
FIG. 11 depicts a user interface displaying a plurality of components and corresponding features for a subsystem of an additive manufacturing system, according to another embodiment show and described herewith.

Referring back to FIG. 10, in step 1016, the processor of the user computing device 220 may display an actual parameter and a corresponding threshold value for each of the one or more features on the display device 408. For example, as illustrated in FIG. 11, for each of the five features including the filament burn time, the average preheat grid voltage, the grid voltage drop after arctrip, the average cathode power, and the average effective work function, actual parameters and corresponding threshold values are displayed. In embodiments, if an actual parameter is less than a minimum threshold, or is greater than a maximum threshold, the display device 408 may display a warning indicator proximate to the actuator parameter. For example, by referring to FIG. 11, the actuator parameter for a grid voltage drop after arctrip is 42.31 volts whereas a maximum threshold value is 7 volts. The display device 408 may show a warning indication such as a check icon 1142 next to the actual parameter because the actual parameter exceeds a maximum threshold value.

Referring back to FIG. 10, in step 1018, the processor of the user computing device 220 may display, for the one or more features, a check icon and a graph icon. For example, by referring to FIG. 11, a check icon 1142 and a graph icon 1144 are displayed next to the feature of grid voltage drop after arctrip in the window for the cathode health component 1124.

Figure 12:
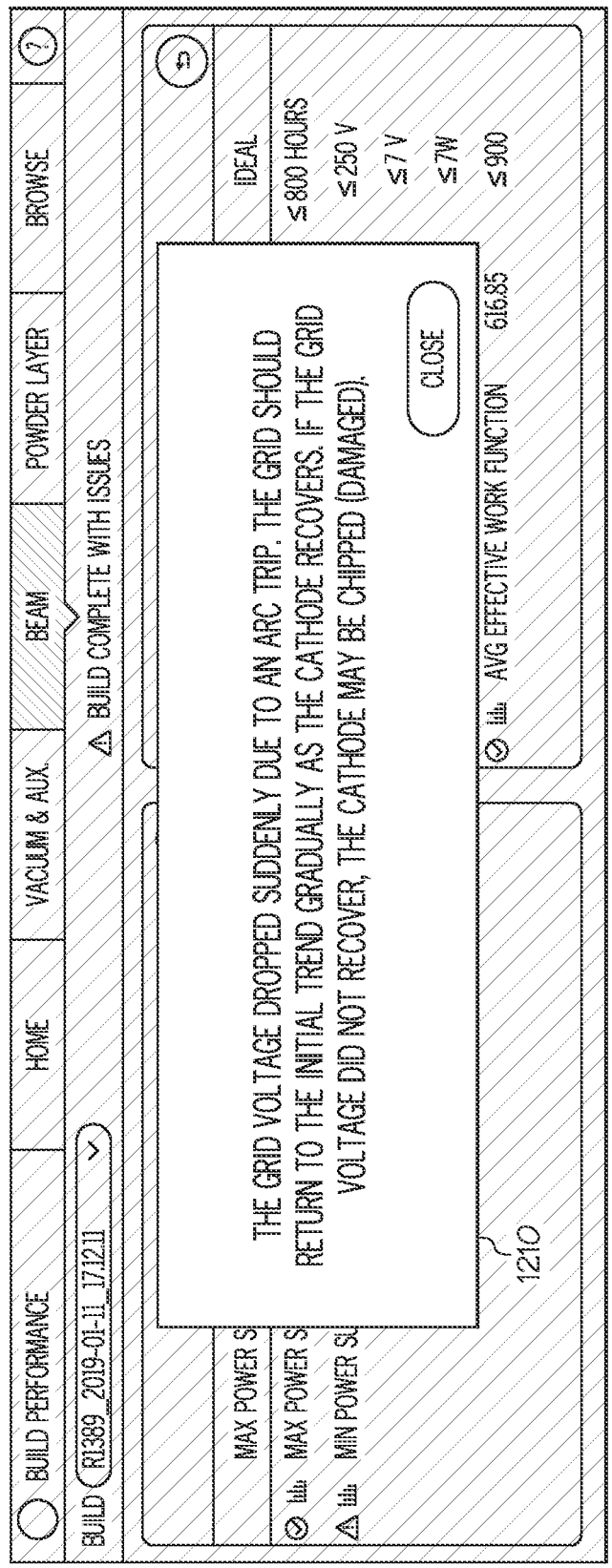
FIG. 12 depicts a user interface displaying explanation of a failure mode, according to one or more embodiments show and described herewith.

Referring back to FIG. 10, in step 1020, the processor of the user computing device 220 may display information of the failure mode associated with the feature in response to activation of the explanation icon. For example, in response to the activation of the check icon 1142 in FIG. 11, the display device 408 may display a window 1210 stating explanation of the failure mode as shown in FIG. 12.

Figure 13:
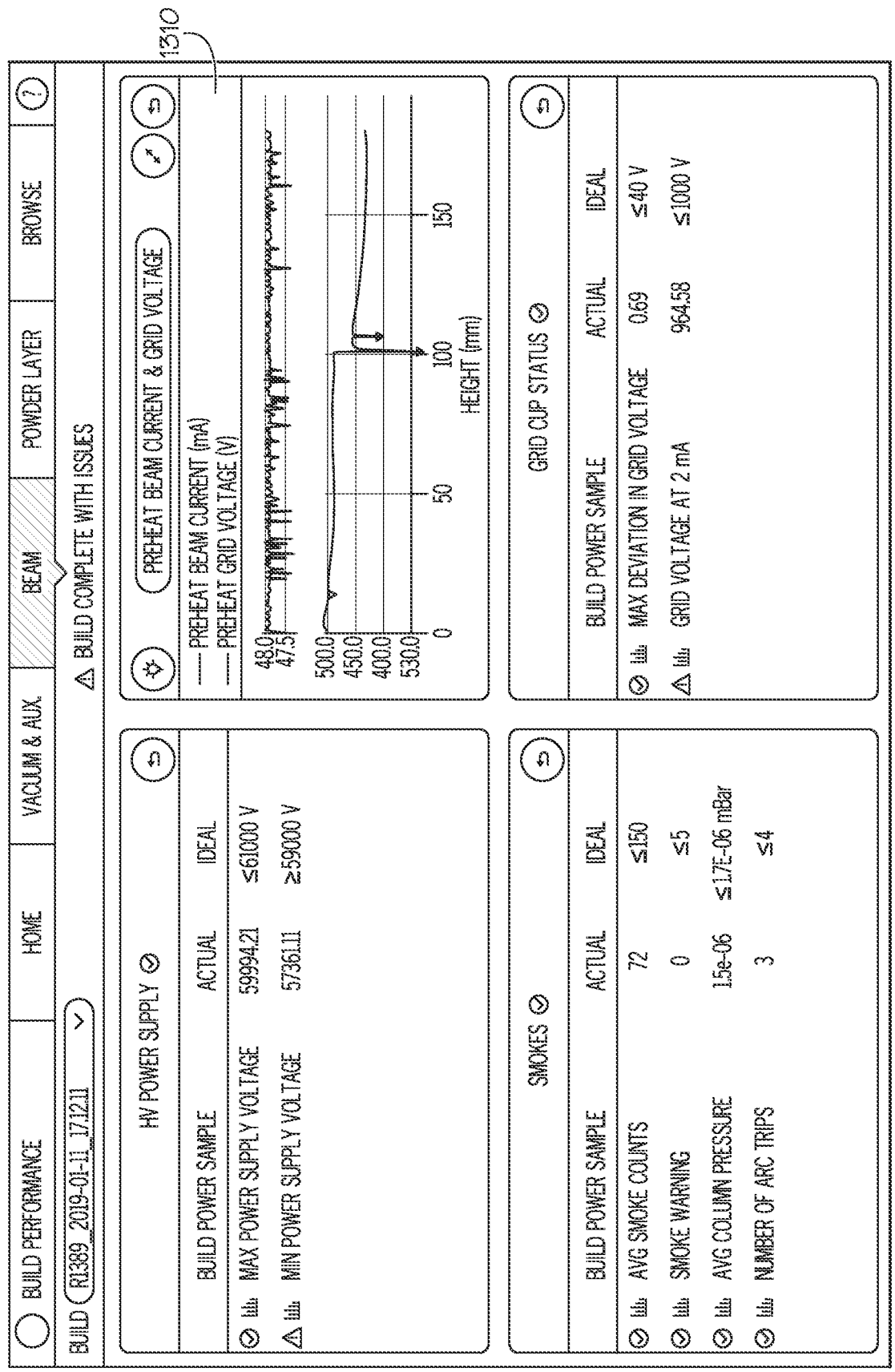
FIG. 13 depicts a user interface displaying a graph for a parameter associated with a failure mode, according to one or more embodiments show and described herewith.

Referring back to FIG. 10, in step 1022, the processor of the user computing device 220 may display a graph illustrating a changing value of the parameter for the feature corresponding to the activated graph icon in response to activation of the graph icon. For example, in response to the activation of the graph icon 1144 in FIG. 11, the display device 408 may display a graph 1310 illustrating a changing value of a preheat grid voltage for a cathode with respect to a height of a build as shown in FIG. 13.

It should now be understood that that the devices, systems, and methods described herein diagnose an additive manufacturing device. The systems and methods determine parameters associated with at least one subsystem of the additive manufacturing device, compare the parameters with threshold values, and determine a failure mode, among a plurality of failure modes, associated with a subsystem of the at least one subsystem of the additive manufacturing device based on the comparison of the parameters with the threshold values. The analyzed output is visualized through a display device indicating current health status of the additive manufacturing device or subsystems thereof. Accordingly, the present disclosure provides users with a visually interactive interface that provides guided steps in diagnosing build/module level issues in a matter of few minutes.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses.

A system for diagnosing an additive manufacturing device is provided. The system includes one or more processors, one or more non-transitory memory modules communicatively coupled to the one or more processors and storing machine-readable instructions that, when executed, cause the one or more processors to: determine parameters associated with at least one subsystem of the additive manufacturing device, the parameters being related to a build generated by the additive manufacturing device, compare the parameters with threshold values, and determine a failure mode, among a plurality of failure modes, associated with a subsystem of the at least one subsystem of the additive manufacturing device based on the comparison of the parameters with the threshold values.

The system of any proceeding clause further includes a screen, wherein the one or more non-transitory memory modules communicatively coupled to the one or more processors store machine-readable instructions that, when executed, cause the one or more processors to: display, on the screen, the failure mode and the subsystem associated with the failure mode.

The system of any proceeding clause, wherein the one or more non-transitory memory modules communicatively coupled to the one or more processors store machine-readable instructions that, when executed, cause the one or more processors to: display, on the screen, information about the build.

The system of any proceeding clause, wherein the one or more non-transitory memory modules communicatively coupled to the one or more processors store machine-readable instructions that, when executed, cause the one or more processors to: determine a cause for a failure in the subsystem associated with the failure mode; display, on a screen, an icon proximate to the failure mode; and in response to an activation of the icon, display, on the screen, the cause for the failure in the subsystem associated with the failure mode.

The system of any proceeding clause, wherein the one or more non-transitory memory modules communicatively coupled to the one or more processors store machine-readable instructions that, when executed, cause the one or more processors to: display, on a screen, an icon proximate to the failure mode; and in response to an activation of the icon, display, on the screen, instructions for addressing the failure mode or an explanation of the failure mode.

The system of any proceeding clause, wherein the one or more non-transitory memory modules communicatively coupled to the one or more processors store machine-readable instructions that, when executed, cause the one or more processors to: display, on a screen, a feedback icon proximate to the failure mode; and in response to an activation of the feedback icon, determine that actions included the instructions for addressing the failure mode has been taken.

The system of any proceeding clause, wherein the one or more non-transitory memory modules communicatively coupled to the one or more processors store machine-readable instructions that, when executed, cause the one or more processors to: display, on a screen, a plurality of tabs for a plurality of subsystems; and in response to an activation of one of the plurality of tabs, display, on the screen, one or more components for the subsystem associated with the activated tab, each of the one or more components including one or more features.

The system of any proceeding clause, wherein the one or more non-transitory memory modules communicatively coupled to the one or more processors store machine-readable instructions that, when executed, cause the one or more processors to: display, on the screen, an actual parameter and a corresponding threshold value for each of the one or more features.

The system of any proceeding clause, wherein the one or more non-transitory memory modules communicatively coupled to the one or more processors store machine-readable instructions that, when executed, cause the one or more processors to: display, for each of the one or more features, a graph icon; and in response to activation of the graph icon, display a graph illustrating a changing value of the parameter for the feature corresponding to the activated graph icon.

The system of any proceeding clause, wherein the at least one subsystem includes a vacuum system, a beam system, or a powder layering system.

The system of any proceeding clause, wherein the threshold values are determined based on machine learning or statistical models on evaluation of builds and parameters for the builds.

The system of any proceeding clause, wherein the one or more non-transitory memory modules communicatively coupled to the one or more processors store machine-readable instructions that, when executed, cause the one or more processors to: receive a request for analyzing a log file for the build; and extract the parameters associated with the at least one subsystem of the additive manufacturing device from the log file.

The system of any proceeding clause, wherein the parameters are direct outputs from the additive manufacturing device or generated from processing of the direct outputs based on domain knowledge or physics.

A method for diagnosing an additive manufacturing device includes determining parameters associated with at least one subsystem of an additive manufacturing device, the parameters being related to a build generated by the additive manufacturing device, comparing the parameters with threshold values, and determining a failure mode, among a plurality of failure modes, associated with a subsystem of the at least one subsystem of the additive manufacturing device based on the comparison of the parameters with the threshold values.

The method of any proceeding clause further includes receiving a request for analyzing a log file for the build, and extracting the parameters associated with the at least one subsystem of the additive manufacturing device from the log file.

The method of any proceeding clause further includes displaying, on a screen, the failure mode and the subsystem associated with the failure mode, and displaying, on the screen, information about the build.

The method of any proceeding clause further includes determining a cause for a failure in the subsystem associated with the failure mode, displaying, on a screen, an icon proximate to the failure mode, and in response to an activation of the icon, displaying, on the screen, the cause for the failure in the subsystem associated with the failure mode.

The method of any proceeding clause further includes displaying, on a screen, an icon proximate to the failure mode, and in response to an activation of the icon, displaying, on the screen, instructions for addressing the failure mode or an explanation of the failure mode.

A non-transitory machine readable media includes computer executable instructions, when executed by one or more processors, configured to cause the one or more processors to: determine parameters associated with at least one subsystem of an additive manufacturing device, the parameters being related to a build generated by the additive manufacturing device; compare the parameters with threshold values; and determine a failure mode, among a plurality of failure modes, associated with a subsystem of the at least one subsystem of the additive manufacturing device based on the comparison of the parameters with the threshold values.

The non-transitory machine readable media of any proceeding clause, wherein the computer executable instructions, when executed by one or more processors, are configured to cause the one or more processors to: display, on a screen, a plurality of tabs for a plurality of subsystems; receive an activation of one of the plurality of tabs; display, on the screen, one or more components for the subsystem associated with the activated tab, each of the one or more components including one or more features; and display, on the screen, an actual parameter and a corresponding threshold value for each of the one or more features.

What is claimed is:

1. A system for diagnosing an additive manufacturing device, the system comprising:
   one or more processors;
   one or more non-transitory memory modules communicatively coupled to the one or more processors and storing machine-readable instructions that, when executed, cause the one or more processors to:
     determine parameters associated with at least one subsystem of the additive manufacturing device, the parameters being related to a build generated by the additive manufacturing device;
     compare the parameters with threshold values; and
     determine a failure mode, among a plurality of failure modes included in failure mode data included in a data storage component of the system, associated with a subsystem of the at least one subsystem of the additive manufacturing device based on the comparison of the parameters with the threshold values.

2. The system of claim 1, further comprising a screen, wherein the one or more non-transitory memory modules communicatively coupled to the one or more processors store machine-readable instructions that, when executed, cause the one or more processors to:
   display, on the screen, the failure mode and the subsystem associated with the failure mode.

3. The system of claim 2, wherein the one or more non-transitory memory modules communicatively coupled to the one or more processors store machine-readable instructions that, when executed, cause the one or more processors to:
   display, on the screen, information about the build.

4. The system of claim 1, wherein the one or more non-transitory memory modules communicatively coupled to the one or more processors store machine-readable instructions that, when executed, cause the one or more processors to:
   determine a cause for a failure in the subsystem associated with the failure mode;
   display, on a screen, an icon proximate to the failure mode; and
   in response to an activation of the icon, display, on the screen, the cause for the failure in the subsystem associated with the failure mode.

5. The system of claim 1, wherein the one or more non-transitory memory modules communicatively coupled to the one or more processors store machine-readable instructions that, when executed, cause the one or more processors to:

display, on a screen, an icon proximate to the failure mode; and in response to an activation of the icon, display, on the screen, instructions for addressing the failure mode or an explanation of the failure mode.

6. The system of claim 5, wherein the one or more non-transitory memory modules communicatively coupled to the one or more processors store machine-readable instructions that, when executed, cause the one or more processors to:

display, on a screen, a feedback icon proximate to the failure mode; and in response to an activation of the feedback icon, determine that actions included the instructions for addressing the failure mode has been taken.

7. The system of claim 1, wherein the one or more non-transitory memory modules communicatively coupled to the one or more processors store machine-readable instructions that, when executed, cause the one or more processors to:

display, on a screen, a plurality of tabs for a plurality of subsystems; and in response to an activation of one of the plurality of tabs, display, on the screen, one or more components for the subsystem associated with the activated tab, each of the one or more components including one or more features.

8. The system of claim 7, wherein the one or more non-transitory memory modules communicatively coupled to the one or more processors store machine-readable instructions that, when executed, cause the one or more processors to:

display, on the screen, an actual parameter and a corresponding threshold value for each of the one or more features.

9. The system of claim 7, wherein the one or more non-transitory memory modules communicatively coupled to the one or more processors store machine-readable instructions that, when executed, cause the one or more processors to:

display, for each of the one or more features, a graph icon; and in response to activation of the graph icon, display a graph illustrating a changing value of the parameter for the feature corresponding to the activated graph icon.

10. The system of claim 1, wherein the at least one subsystem includes a vacuum system, a beam system, or a powder layering system.

11. The system of claim 1, wherein the threshold values are determined based on machine learning or statistical models on evaluation of builds and parameters for the builds.

12. The system of claim 1, wherein the one or more non-transitory memory modules communicatively coupled to the one or more processors store machine-readable instructions that, when executed, cause the one or more processors to:

receive a request for analyzing a log file for the build; and extract the parameters associated with the at least one subsystem of the additive manufacturing device from the log file.

13. The system of claim 1, wherein the parameters are direct outputs from the additive manufacturing device or generated from processing of the direct outputs based on domain knowledge or physics.

14. A method for diagnosing an additive manufacturing device, the method comprising:

determining parameters associated with at least one subsystem of an additive manufacturing device, the parameters being related to a build generated by the additive manufacturing device;

comparing the parameters with threshold values; and determining a failure mode, among a plurality of failure modes included in failure mode data included in a data storage component of a system, associated with a subsystem of the at least one subsystem of the additive manufacturing device based on the comparison of the parameters with the threshold values.

15. The method of claim 14, further comprising:

receiving a request for analyzing a log file for the build; and extracting the parameters associated with the at least one subsystem of the additive manufacturing device from the log file.

16. The method of claim 14, further comprising:

displaying, on a screen, the failure mode and the subsystem associated with the failure mode; and displaying, on the screen, information about the build.

17. The method of claim 14, further comprising:

determining a cause for a failure in the subsystem associated with the failure mode;

displaying, on a screen, an icon proximate to the failure mode; and in response to an activation of the icon, displaying, on the screen, the cause for the failure in the subsystem associated with the failure mode.

18. The method of claim 14, further comprising:

displaying, on a screen, an icon proximate to the failure mode; and in response to an activation of the icon, displaying, on the screen, instructions for addressing the failure mode or an explanation of the failure mode.

19. A non-transitory machine readable media comprising:

computer executable instructions, when executed by one or more processors, configured to cause the one or more processors to:

determine parameters associated with at least one subsystem of an additive manufacturing device, the parameters being related to a build generated by the additive manufacturing device;

compare the parameters with threshold values; and determine a failure mode, among a plurality of failure modes included in failure mode data included in a data storage component of a system, associated with a subsystem of the at least one subsystem of the additive manufacturing device based on the comparison of the parameters with the threshold values.

20. The non-transitory machine readable media of claim 19, wherein the computer executable instructions, when executed by one or more processors, are configured to cause the one or more processors to:

display, on a screen, a plurality of tabs for a plurality of subsystems;

receive an activation of one of the plurality of tabs;

display, on the screen, one or more components for the subsystem associated with the activated tab, each of the one or more components including one or more features; and display, on the screen, an actual parameter and a corresponding threshold value for each of the one or more features.

* * * * *